US009365657B2

(12) United States Patent
Rand et al.

(10) Patent No.: US 9,365,657 B2
(45) Date of Patent: Jun. 14, 2016

(54) SMALL PARTICLE SIZE TELOMERS OF METHACRYLIC ACID OR ANHYDRIDE

(71) Applicant: Rohm and Haas Company, Philadelphia, PA (US)

(72) Inventors: Charles J. Rand, Philadelphia, PA (US); C. Damien Rodowski, Downingtown, PA (US); Barry Weinstein, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 325 days.

(21) Appl. No.: 13/644,832

(22) Filed: Oct. 4, 2012

(65) Prior Publication Data
US 2013/0123436 A1 May 16, 2013

Related U.S. Application Data

(60) Provisional application No. 61/558,802, filed on Nov. 11, 2011.

(51) Int. Cl.
*C08F 2/38* (2006.01)
*C08F 20/08* (2006.01)
*C08F 220/06* (2006.01)
*C08F 220/08* (2006.01)
*C04B 24/26* (2006.01)
*C08G 81/02* (2006.01)
*C04B 103/32* (2006.01)
*C04B 103/40* (2006.01)

(52) U.S. Cl.
CPC ............... *C08F 2/38* (2013.01); *C04B 24/2647* (2013.01); *C08F 20/08* (2013.01); *C08F 220/06* (2013.01); *C08F 220/08* (2013.01); *C08G 81/025* (2013.01); *C04B 2103/32* (2013.01); *C04B 2103/408* (2013.01); *C08F 2500/24* (2013.01); *Y10T 428/2982* (2015.01)

(58) Field of Classification Search
CPC ........ C08F 220/06; C08F 220/08; C08F 2/38; C08F 2500/24; C08F 8/48; C08F 20/08; H04L 1/0009; H04L 1/0057; H04L 1/18
USPC ............... 526/208, 233, 271, 229; 525/330.1, 525/385; 428/402
See application file for complete search history.

(56) References Cited

U.S. PATENT DOCUMENTS

| | | | |
|---|---|---|---|
| 3,137,660 A | 6/1964 | Jones | |
| 4,138,541 A * | 2/1979 | Cenci et al. | 524/233 |
| 4,742,123 A | 5/1988 | Kopchik | |
| 5,130,369 A | 7/1992 | Hughes et al. | |
| 5,216,099 A * | 6/1993 | Hughes et al. | 526/318.2 |
| 5,256,746 A | 10/1993 | Blankenship et al. | |
| 5,294,686 A * | 3/1994 | Fiarman et al. | 526/233 |
| 5,539,071 A * | 7/1996 | Steffler | 526/208 |
| 5,614,017 A | 3/1997 | Shawl | |
| 6,071,434 A | 6/2000 | Davis et al. | |
| 6,384,111 B1 | 5/2002 | Kistenmacher et al. | |
| 6,673,885 B1 | 1/2004 | Shibata et al. | |
| 7,906,591 B2 * | 3/2011 | Weinstein et al. | 525/330.1 |
| 8,008,374 B2 | 8/2011 | Sulser et al. | |
| 8,022,120 B2 | 9/2011 | Becker et al. | |
| 2004/0024130 A1 | 2/2004 | Nelson et al. | |
| 2006/0004148 A1 | 1/2006 | Sulser et al. | |
| 2008/0153946 A1 * | 6/2008 | Kelly | 524/80 |
| 2009/0137746 A1 | 5/2009 | Weinstein et al. | |
| 2009/0182061 A1 | 7/2009 | Moro et al. | |
| 2010/0069532 A1 | 3/2010 | Arocha et al. | |
| 2010/0273923 A1 | 10/2010 | Suau et al. | |
| 2011/0021698 A1 * | 1/2011 | Vyorykka et al. | 524/832 |
| 2013/0122299 A1 * | 5/2013 | Rand et al. | 428/402 |

FOREIGN PATENT DOCUMENTS

| | | |
|---|---|---|
| EP | 0516346 A1 | 12/1992 |
| EP | 1942142 A1 | 7/2008 |
| EP | 2033992 A2 | 3/2009 |
| EP | 2072531 A1 | 6/2009 |
| GB | 1595688 | 8/1981 |
| JP | 4255709 A | 9/1992 |
| JP | 2003002712 A * | 1/2003 |
| WO | 2007051858 A2 | 5/2007 |
| WO | 2008068213 A1 | 6/2008 |

OTHER PUBLICATIONS

Wikipedia, The free encyclopedia, Powder Coating Advantages.*
Machine translation of JP 2003002712A, 2016.*
Bang-Chein Ho et al., "Thermal Degradation of Polymethacrylic Acid," Journal of Polymer Science, Part A: Polymer Chemistry, vol. 30, 1992, pp. 2389-2397.
D. H. Grant et al., "The Thermal Decomposition of Polymethacrylic Acid," Polymer, No. 1, 1960, pp. 125-134.

(Continued)

Primary Examiner — Liam J Heincer
(74) Attorney, Agent, or Firm — Andrew Merriam

(57) ABSTRACT

The present invention provides compositions comprising particles or agglomerates of one or more telomer or cotelomer ((co)telomer) of one or more methacrylic acids or anhydrides having a mean average particle size of from 2 μm to 1 mm, preferably from 5 to 500 μm. In addition, the present invention provides methods comprising aqueous solution addition polymerizing a monomer mixture of one or more methacrylic acid in the presence of a heteroatom containing compound, drying the resulting copolymer at a temperature of from 120 to 230° C. and reducing its particle size to make a (co)telomer particle or agglomerate; the methods may further comprise reacting the (co)telomer particle or agglomerate with one or more polyether polyol, alkyl polyether polyol, polyether amine or alkyl polyether amine, with heating, to form a comb polymer useful, e.g. as a superplasticizer or dispersant.

11 Claims, No Drawings

(56) References Cited

OTHER PUBLICATIONS

I. C. McNeill et al., "Thermal Stability and Degradation Mechanisms of Poly(Acrylic Acid) and its Salts: Part 1-Poly (Acrylic Acid)," Polymer Degradation and Stability, vol. 29, 1990, pp. 233-246.
C. A. Fyfe et al., "Investigation of the Thermal Degradation of Poly(acrylic acid) and Poly(methacrylic acid) by High Resolution 13C CP/MAS NMR Spectroscopy," Macromolecules, vol. 19, 1986, pp. 1909-1912.
A. A. Litmanovich et al., "Peculiarities of Cyclic Anhydride Links Formation in Macromolecules of Polymethacrylic Acid Bound in Complexes with Poly Ethylene Glycols of Various Molecular Masses," JHMS (Journal of High Molecular Compositions), No. 9, 1975, pp. 681-684.

* cited by examiner

SMALL PARTICLE SIZE TELOMERS OF METHACRYLIC ACID OR ANHYDRIDE

The present invention relates to comb polymers from small particle size telomers of methacrylic acids and anhydrides. More particularly, it relates to telomers and cotelomers of methacrylic acid and methacrylic anhydride and methods for making comb polymers from them.

Improved high water reducing super plasticizers for cement admixtures include alkyl capped poly(ethylene glycol) esters of poly(methacrylic acid), p-MAA. Predominantly, these are manufactured via copolymerization of methoxypolyethyleneglycol methacrylate with methacrylic acid (MAA) or by methyl capped polyglycol, i.e. Carbowax™ (The Dow Chemical Co., Midland, Mich.), esterification of p-MAA. Such polymers and copolymers are prepared conventionally with sulfur containing chain transfer polymerization or high concentrations of initiator (>>>0.1%) to give polymers having a molecular weight of less than 15,000 daltons. However, such polymers are not thermally stable which greatly limits their processing flexibility and limits the ease with which one can make superplasticizers from them.

Superplasticizers can also be manufactured via alkyl or methyl capped polyglycol esterification or aminopolyglycol amidation of currently available polycarboxylate solution polymer precursors, such as pMAA. In such methods, users often remove all of the water by solvent assisted distillation, vacuum removal or inert gas sparging prior to reacting the polyacids as described in U.S. Pat. No. 5,670,578 to Shawl and U.S. Pat. No. 6,846,882 to Kroner.

U.S. patent publication no. 2009/0182061A, to Moro et al. of Coatex S.A.S., discloses grafting polyoxyalkylated lateral groups onto spray dried (meth)acrylic carboxyl group containing polymers in the presence of an acid catalyst. The process is said to enable rapid, low cost processing in the absence of solvent. The (meth)acrylic polymers are spray dried in a dryer by atomization. However, the methods for making the (pMAA) polymers and copolymers in Moro et al. provide a low yield upon esterification or amidation resulting from a secondary reaction caused by decomposition of the polyoxyalky side chain forming reactant. The yield of such a process makes it undesirable in practice.

The present inventors have sought to solve the problem of providing a more reactive polycarboxylate polymer precursor in a solid or dry form for making comb polymers, such as those used as superplasticizers, rheology modifiers and colloidal stabilizers so that users would not need to remove water from them before using.

STATEMENT OF THE INVENTION

In accordance with the present invention, polycarboxylate comb polymer precursors comprise particles or agglomerates of one or more (co)telomers of methacrylic acids and/or anhydrides having a heteroatom and, further, having a mean average particle size of from 2 µm to 1 mm, or up to 700 µm, or, preferably, 5 µm or more, or, preferably, 10 µm or more, more preferably, up to 500 µm, particularly, up to 175 µm. Preferably, comb polymer precursors are telomers and cotelomers containing one or more carboxylic anhydride group.

Preferably, to increase comb polymer reaction yield, the (co)telomer particles or agglomerates are phosphorus oxide containing or sulphonate end group containing telomers and cotelomers of methacrylic acids and/or anhydrides.

Thus, the present invention provides heteroatom containing (co)telomers of methacrylic acid and/or anhydride having a weight average molecular weight (Mw) of from 500 to 100,000, or, preferably, 1,000 or more, or, preferably, 50,000 or less, or, more preferably, from 2,000 to 20,000 or less, or, still more preferably, from 2,500 to 10,000. The (co)telomers of the present invention comprise the polymerization residue of (i) from 20 to 98 wt. %, preferably, 40 wt. % or more or, preferably, 60 wt. % or more of polymerized units bearing methacrylic acid, anhydride and/or salt groups, based on the total weight of reactants used to make the (co)telomer. Preferably, such (co)telomers are phosphorus containing or sulphonate end group containing. Drying of the (co)telomers will increase the proportion of methacrylic anhydride groups in the (co)telomers.

The (co)telomers of the present invention can comprise from 1 to 100 wt. % of methacrylic anhydride repeat units, based on the total weight of methacrylic acid and anhydride monomers used to make the (co)telomers.

Preferably, the (co)telomers of the present invention comprise at least 10 wt. % of methacrylic anhydride groups, based on the total weight of acidic polymerized units, as determined by Fourier transform infrared (FTIR) spectroscopy, preferably, 20 wt. % or more, or, more preferably, 30 wt. % or more, or, up to 70 wt. % or, more preferably, up to 50 wt. %.

In another aspect of the present invention, methods for making comb polymers from (co)telomers comprise aqueous solution polymerizing a monomer mixture of one or more methacrylic acid or its salt in the presence of a heteroatom containing compound chosen from a bisulfite, sulfite, RAFT (Reversible Addition-Fragmentation Chain Transfer) catalyst, mercaptan, such as alkyl mercaptan or an oxidized alkyl mercaptan, phosphite, and hypophosphite containing compound, e.g. as a chain transfer agent, drying the resulting copolymer and reducing its particle size. Alternatively, aqueous solution polymerizing can take place in the presence of a water soluble azo initiator.

The drying of the present invention can comprise spray drying or extrusion.

Particle size reduction of the (co)telomers of the present invention can comprise any of the methods known in the art including grinding, milling or comminuting, crushing, or cryogrinding.

In another aspect of the present invention methods to make comb polymers comprise reacting the dry methacrylic acid and/or anhydride (co)telomer particles or agglomerates of the present invention with one or more polyether polyol, alkyl polyether polyol, polyether amine or alkyl polyether amine, with heating, to form a comb polymer. Such a reaction can take place in a batch reactor. Preferably, such reaction to form a comb polymer can take place in a continuous reactor, such as, for example, an extruder, a continuous stirred tank reactor, or in an exchange column or by solid phase combinatorial synthesis.

When forming a comb polymer from (co)telomers, the reaction is run in oxygen free or oxygen starved conditions, preferably, in an inert atmosphere or, more preferably, in an inert atmosphere (nitrogen and/or argon) in the presence of an antioxidant such as phosphorous +1, for example, sodium hypophosphite or a 3 to 9 carbon alkyl group containing aromatic amine, such as Irganox™ 5057 (Ciba-Geigy, Basel, CH) or a phenothiazine (CAS 92-84-2).

Preferably, the (co)telomers of the present invention have on average at least one heteroatom, e.g. a sulfur, nitrogen, or phosphorus atom that is bound to a carbon atom of the (co) telomer backbone, as determined by NMR, as appropriate, as a terminal or within the polymer chain. The at least one heteroatom in the polymer backbone can be bound to two carbon atoms, as a phosphinate, or one carbon atom as a, nitrite, sulphonate or sulfate present as a terminus bound to one carbon atom either directly or through an oxygen.

The (co)telomers of methacrylic acid and/or anhydride of the present invention may be made with additional non-acid group containing monomers, such as vinyl monomers like $C_1$ to $C_{18}$ alkyl (meth)acrylates and styrene.

In accordance with the present invention, the (co)telomers comprise from 2 to 20 wt. %, based on the total weight of reactants (i.e. monomers and heteroatom containing compounds) used to make the telomer, or, preferably, 4 wt. % or more, or, preferably, 15 wt. % or less of a heteroatom containing compound which may contain a functional group chosen from a bisulfite, sulfite, sulfate, alkyl mercaptan, oxidized alkyl mercaptan, hypophosphite, and phosphite containing compound. Other suitable heteroatom compounds may include RAFT compounds known in the art. Still other controlled free radical polymerization (CRP) methods and suitable heteroatom containing compounds may include those described in Aust. J. Chem. Vol. 55, 367-379 (2002) (Co)telomers can contain, for example, a phosphonate compound, such as, for example, phosphonic acids or their inorganic salts or ammonium, e.g. alkali(ne earth) metalsalts, $C_1$ to $C_4$ dialkyl or trialkyl or phenyl phosphites or diphenyl phosphite; orthophosphorous acid or salts thereof or a hypophosphite compound or its salt, such as, for example, sodium hypophosphite.

The (co)telomers may be homotelomers of methacrylic acids, i.e. made from methacrylic acid and heteroatom containing compounds. Also, heteroatom containing cotelomers of methacrylic acid and/or anhydride can made with additional monomers, such as vinyl monomers like $C_1$ to $C_{18}$ alkyl acrylates and styrene or acrylic acid.

The polymer compositions of the present invention may comprise powders, pellets, prills or granules of the (co)telomers of methacrylic acids or anhydrides or suspensions thereof in non-aqueous carriers, such as oils, e.g. vegetable oils, glycols, polyglycols, ethers, glycol ethers, glycol esters and alcohols, preferably having a solids content of 50 wt. % or more, or, more preferably, 70 wt. % or more.

The present invention comprises methods for making (co) telomers of methacrylic acid and/or anhydride. To make phosphorus oxide telomers, the methods comprise drying one or more (co)telomer of methacrylic acid at a temperature of from 120 to 230° C., preferably, 140° C. or more or, preferably, 220° C. or less. To make (co)telomers other than phosphorus oxide telomers, the methods comprise drying one or more (co)telomer of methacrylic acid at a temperature of from 180 to 230° C., preferably, 200° C. or more or, preferably, 220° C. or less. The drying can take place in an extruder, kneader or kneader reactor, fluid bed dryer, drum dryer, evaporator, heated mixer and any of the foregoing following spray drying.

As used herein, the term "acidic polymerized units" refers to carboxylic anhydrides, carboxylic acids and salts thereof. Carboxylic anhydrides of methacrylic acid can form from the acidic functions of neighboring acidic polymerized units along a single telomer chain, from acidic functions of distal acidic polymerized units along a single telomer chain, or from acidic functions of separate telomer chains.

As used herein the term phosphorus oxide refers to any oxide of phosphorus in the +3 or +1 oxidation state.

As used herein, the term "average particle size" refers to a mean average particle size determined by Laser Diffraction Particle Size Analysis.

As used herein, the term "based on the total weight of monomers" refers to the total weight of addition monomers, such as, for example, methacrylic acids and vinyl monomers.

As used herein, the term "total weight of reactants" of a polymer is the total solids weight of a monomer mixture used to make the polymer, including any heteroatom containing compounds.

As used herein, the term "Fourier transform infrared (FTIR) spectroscopy" means that which creates a spectrum measured using a ThermoNicolet™ 6700 FTIR (Thermo Fisher Scientific Waltham, Mass.) spectrometer with a variable-temperature Specac Golden Gate™ diamond attenuated total reflectance (ATR) accessory (Specac Inc (USA) Cranston, R.I.), data collection parameters at 4 cm$^{-1}$ resolution, 16 scans Happ-Genzel apodization and no zero-filling. The ATR accessory was preheated to the desired temperature, and then a film of an aqueous solution of a hypophosphite methacrylic acid telomer at about 6000 daltons was cast onto the ATR crystal. Spectra were continuously measured over time.

As used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation, version B.04.02 with Agilent GPC-add on version B.01.01. The column set was TOSOH Bioscience TSKgel G2500PWxI 7.8 mm ID×30 cm, 7 μm column (P/N 08020) (TOSOH Bioscience USA South San Francisco, Calif.) and a TOSOH Bioscience TSKgel GMPWxI 7.8 mm ID×30 cm, 13 μm (P/N 08025) column. A 20 mM Phosphate buffer in MilliQ HPLC Water, pH ~7.0 was used as the mobile phase. The flow rate was 1.0 ml/minute. A typical injection volume was 20 μL. The system was calibrated using poly(acrylic acid), Na salts Mp 216 to Mp 1,100,000, with Mp 900 to Mp 1,100,000 standards from American Polymer Standards (Mentor, Ohio).

As used herein, the term "(co)telomer" refers to both homotelomers and cotelomers, wherein a homotelomer is the reaction product of one methacrylic acid monomer and one or more heteroatom containing compound which acts to control molecular weight as a chain transfer agent or initiator.

As used herein, the term "wt. %" stands for weight percent.

As used herein, the term "31-P NMR" means an analysis of polymer or telomer samples prepared by adding 0.4-0.5 g of an aqueous solution of polymer or telomer analyte at 40-45% solids to 0.5 g of $D_2O$ (Aldrich Chemical Company, St. Louis, Mo.) and mixing, followed by placing the solution polymer in a 17.8 cm (7"), 500 Mz NMR tube and analyzing using a Bruker 500 MHz multi nuclei NMR fully decoupled with 12000 acquisitions having sweep width of 14705 Hz and pulse delay of 2 seconds (Bruker, Billerica, Mass.).

As used herein, the term "NMR" means an analysis of polymer or telomer samples prepared by adding 0.4-0.5 g of an aqueous solution of polymer or telomer analyte at 40-45% solids to 0.5 g of $D_2O$ (Aldrich Chemical Company, St. Louis, Mo.) and mixing, followed by placing the solution polymer in a 17.8 cm (7"), 500 Mz NMR tube and analyzing using a Bruker 500 MHz multi nuclei NMR fully decoupled with 12000 acquisitions having sweep width of 14705 Hz and pulse delay of 2 seconds (Bruker, Billerica, Mass.)

All ranges recited are inclusive and combinable. For example, a disclosed temperature of 120 to 230° C., preferably, 140° C. or more or, preferably, 220° C. or less, would include a temperature of from 120 to 140° C., from 120 to 220° C., from 140 to 220° C., from 140 to 230° C., from 120 to 230° C., and from 220 to 230° C.

Unless otherwise indicated, all temperature and pressure units are room temperature and standard pressure.

All phrases comprising parentheses denote either or both of the included parenthetical matter and its absence. For example, the phrase "(co)telomer" includes, in the alternative, telomers and cotelomers.

The present inventors have found that dried (co)telomers, such as phosphorus oxide (co)telomers, from methacrylic acid and/or its anhydride, especially its anhydride, reacts far faster and more efficiently with polyol amines, or polyol ethers than (co)telomers made from acids or anhydrides other than primarily methacrylic acid and/or it's anhydride. Such telomers do not require catalyst and stabilizers to form the comb polymers. Further, in forming comb polymers from (co)telomers from methacrylic acids and/or anhydrides and alkyl polyethylene glycols, the telomer particle size plays a significant role in efficiency. At least a 25% decrease in esterification yield under the same reaction conditions is seen when moving from a 5.9 um to a 215.2 um starting material. Accordingly, the (co)telomers of the present invention are particularly attractive precursors for modification to make comb polymers because they can be shipped in dry form and processed rapidly under demanding conditions, e.g. high heat. The (co)telomers of the present invention are surprisingly shelf stable.

In addition, small particle size (co)telomers display reactivity with polyols, amino-polyols both complex and simple primary and secondary alcohols and amines. Such reactivity makes the (co)telomers of the present invention extremely versatile intermediates for the preparation of a myriad of cement admixture products, polymeric surfactants and detergent builders; such reactivity also makes the (co)telomers of the present invention useful as thermoset binders with various crosslinkers and organic extenders, such as dextrose; and as pigment dispersants.

The small particle size (co)telomers of the present invention have on average at least one heteroatom in the polymer backbone that is bound to a carbon atom in the polymer backbone, as determined by NMR. The at least one heteroatom in the polymer backbone can be bound to two carbon atoms, as a dialkyl phosphinate or sulphonate along the carbon chain. Examples of structures of such polymers is as described in U.S. Pat. No. 5,294,686 to Fiarman et al. Other small particle size (co)telomers of the present invention have on average at least one sulfur or nitrogen atom attached to the polymer backbone that is bound to a carbon atom, as a terminal group such as an alkyl mercaptan sulfonate or sulfate, phosphinate, phosphonate or a carbon fragment from the decomposition of an azo initiator having a vinyl polymer backbone substituent.

In accordance with the present invention, small particle size (co)telomers of the present invention can be prepared by chain transfer polymerization of (meth)acrylic acid (MAA) by conventional aqueous solution addition polymerization methods in the presence of a heteroatom containing compound and an initiator compound, and drying to dehydrate them at a temperature of 120° C. or higher, and up to 230° C., or, 140° C. or higher, preferably, 180° C. or higher, and, preferably, 220° C. or less. Heating time is lower at higher temperatures and may generally range from 5 minutes to 8 hours, preferably, 10 minutes or more, or, preferably, 2 hours or less, more preferably, 15 to 30 minutes, following by reducing their particle size.

Addition polymerization can be carried out by conventional aqueous solution polymerization methods in the presence of an initiator, such as, for example, a persulfate salt or a bis-azo compound, such as those available from Wako Chemicals, Inc. (Richmond, Va.).

In the case where initial drying is followed by heating, such as spray drying and further heating, the further heating takes place at the above recited temperatures for a period of from 5 minutes or more, or, to 90 minutes, preferably, 60 minutes or less, more preferably, 10 to 30 minutes.

Polymers of methacrylic acids or anhydrides having a weight average molecular weight of less than 100,000, and its corresponding (co)polymers are readily made as (co)telomers by polymerization in the presence of heteroatom containing compounds. Suitable heteroatom containing compounds may be chosen from alkyl mercaptans, oxidized alkyl mercaptans, sulfites, sulfonates, phosphites, hypophosphites and azo initiators or carbon centered fragments generated from the decomposition of azo initiators, as well as their combinations.

Suitable drying methods may include one or more in combination of, for example, extrusion, such as in a single-screw or twin-screw extruder; kneading, such as in a single shaft or twin-shaft kneader reactor, banbury mixer, or a Buss-Kneader Reactor or Single screw reciprocating extruder/mixer; evaporation, such as in a wiped film evaporator or falling film evaporator vessel; heated mixing, such as in a continuous stirred tank reactor (CSTR) or single and twin-rotor mixers, for example, PLOUGHSHARE™ Mixers (Littleford Day Inc., Florence, Ky.), double arm mixers, sigma blade mixer, or vertical high intensity mixer/compounders; spray drying coupled additional higher temperature drying, such as fluidized bed dryers, drum dryers or belt dryers.

The small particle size (co)telomers of the present invention can be prepared several known methods of drying and reducing particle size. Suitable methods of reducing particle size may include, for example, grinding, ball milling, crushing, and trituration.

The small particle size (co)telomers of the present invention find many uses, for example, as thermoset powder binders in combination with polyols, polyamines, alkanolamines, polysaccharides or reducing sugars; as pigment dispersants, especially in the form of salts; and as intermediates for making polycarboxylate comb polymers having one or more polyether polyol, alkyl polyether polyol, polyether amine or alkyl polyether amine ester or amide side chain. One example of such a side chain would be a alkoxy(poly)oxyalkylene ester or amide side chain, such as, for example, a methoxypolyethyleneglycol ester side chain.

Suitable polyether polyol, alkyl polyether polyol, polyether amine, alkyl polyether amine or alkoxy(poly)oxyalkylene functional side chains for the small particle size telomers of the present invention can have from 1 to 500, preferably, 150 or less or 6 or more, or, preferably, from 10 to 100 oxyalkylene groups. The alkoxy group of the side chain may have from 1 to 20 carbon atoms. Such esterification and amidation is a conventional process comprising heating and mixing together the small particle size telomers of methacrylic anhydride with alkoxy(poly)oxyalkylene glycol or its amine.

Suitable alkyl polyether polyols, polyether amines or alkyl polyether amines useful for forming comb polymers can be one or more compounds of formula I, II, III or IV

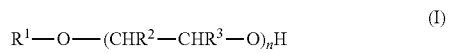
(I)

(II)

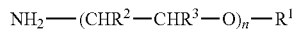

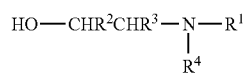

wherein $R^1$ is selected from $C_1$-$C_{50}$ alkyl; $R^2$ and $R^3$ are independently selected from H, methyl or ethyl; and $R^4$ is independently selected from $C_1$-$C_{50}$ alkyl, hydroxyethyl, acetoxyethyl, hydroxy-isopropyl, or acetoxy-isopropyl; and n is an integer from 1-230.

Examples of compounds of formula (I) are alkylpolyalkylene glycols which include but are not limited to methylpolyethylene glycol having a molecular weight of 350, methylpolyethylene glycol having a molecular weight of 500; methylpolyethylene glycol having a molecular weight of 750; methylpolyethylene glycol having a molecular weight of 1000; methylpolyethylene glycol having a molecular weight of 1500; methylpolyethylene glycol having a molecular weight of 2000; methylpolyethylene glycol having a molecular weight of 5000 to 10,000; butylpolyethylene glycol having a molecular weight of 10,000; and isodecylpolyethylene glycol having a molecular weight of 1000.

The alkyl polyether polyols of the formulae I and II and the alkyl polyether amines of formulae III and IV can be used together with ammonia or amines in the preparation of comb polymers. Suitable amines are, for example, alkylamines having molar masses of up to 2000 or $C_{30}$-dialkylamines having molar masses of up to 5000, for example, ethylamine, butylamine, hexylamine, octylamine; fatty amines, such as, for example, stearylamine, tallow fatty amine and palmitylamine; unsaturated fatty amines, e.g. oleylamine; long-chain amines such as polyisobuteneamines having molar masses of from 500 to 2000; alkoxyalkylamines, such as 2-methoxyethylamine, methoxypropylamines; alkoxylated alkylamines or alkoxylated dialkylamines; and amino alcohols, such as ethanolamine, and diethanolamines, such as N,N dimethyl ethanolamine, or N,N diethyl ethanolamine.

Examples of compounds that give alkoxy(poly)oxyalkylene side chains are available from The Dow Chemical Company (Midland, Mich.) under the CARBOWAX™ brand name, and from Clariant as M-Type and B11/D21 Polyglycols (Clariant Corp., Charlotte, N.C.).

Many uses in a wide variety of applications exist for the comb polymers prepared from the small particle size telomers of the present invention. Such comb polymers find use as superplasticizers, especially where the alkoxy group of the side chain has from 1 to 4 carbon atoms. Such comb polymers are particularly useful as builder in detergent compositions, especially liquid detergent compositions. In addition, such comb polymers can be used as polymeric dispersants such as pigment dispersants for various coatings applications, suspending agents for suspending particulate materials in fluid media, and the like. In addition, such comb polymers find use as polymeric binders for a variety of coatings applications, such as for architectural coatings, marine coatings, paper coatings, can coatings, binders and coatings for textile and non-woven material, roll coatings, and the like. Further, comb polymers find use as tanning agents for leather manufacture and as rheology modifiers and thickeners, especially where the alkoxy group of the side chain is hydrophobic, having from 8 to 20 carbon atoms.

The following examples illustrate the present invention. Unless otherwise indicated, all parts and percentages are by weight and all temperatures are in degrees centigrade (° C.).

The following experimental test methods were used:

Size Exclusion Chromatography (SEC): Separations were carried out on a liquid chromatograph consisting of an Agilent 1100 Model isocratic pump, autosampler, degasser (Agilent Technologies, Santa Clara, Calif.) and a Waters 410 Model differential refractometer (Waters Corp., Milford, Mass.) operated at ambient temperature. System control, data acquisition, and data processing were performed using version 3.1 of Cirrus® software (Polymer Laboratories, part of Agilent, Church Stretton, UK).

SEC separations were performed using: a) two analytical Plaquagel-OH™ 30A columns (300×7.5 mm ID (inner diameter) plus a guard column (50×7.5 mm ID) (Agilent Technologies, Santa Clara, Calif.) in 20 mM $NaH_2PO_4$ at pH=7 b) three Shodex Asahipak™ GF-310HQ+GF-510HQ+GF-710HQ columns (300×7.8 mm ID) (Showa Denko KK, Kawasaki, Japan) in 100 mM NH4Ac in MeOH. Unless otherwise indicated, 100 µL of sample solution were injected into column set for SEC separations.

SYNTHESIS FOR EXAMPLES 1 TO 10, COMPARATIVES INCLUDED

The hypophosphite telomers of MAA were formed from methacrylic acid polymerized in aqueous solution in the presence of sodium hypophosphite having 9.0 weight % of sodium hypophosphite hydrate based on total weight of monomer.

The precursor poly(methacrylic acid) of Examples 1, and 2 was formed by reacting methacrylic acid in aqueous solution the presence of 9.0 wt. % of sodium hypophosphite, all weights based on the total weight of monomer (MAA) charge. The precursor poly(methacrylic acid) of Example 3 was formed by reacting methacrylic acid in aqueous solution the presence of 13.0 wt. % sodium persulfate initiator, respectively, all weights based on the total weight of monomer (MAA) charge.

The precursor poly(methacrylic acid) of Example 7 was formed by reacting methacrylic acid in aqueous solution the presence of 9.0 wt. % of sodium hypophosphite, all weights based on the total weight of monomer (MAA) charge. The polymer of Example 7A comprised a persulfate containing pMAA (Mw) ~6,500 formed by aqueous solution polymerization in the presence of 13.0 wt % persulfate initiator, all weights based on the total weight of monomer (MAA) charge.

Examples 1, 2 and 3

Fine Particle Size Polycarboxylates

Materials were esterified to make comb polymers. First, a hypophosphite telomer of methacrylic acid having a weight average molecular weight of ≈6000 was heated at 150° C. for 2 hours to drive off the water and was used as Example 1. A portion of the oven dried hypophosphite containing polymethacrylic acid (pMAA) was then heated at 200° C. for 30 minutes to convert the acid to polymethacrylic anhydride (pMAAn) which was Example 2. Also persulfate initiated pMAA having a Mw of 6,500 was used in Example 3. All three materials were ground using a mortar and pestle followed by further grinding with a Retsch (Newtown, Pa.) MM400 ball mill at 30 hz for 2 minutes. The particle size analysis was done on dry material with a Beckman-Coulter (Brea, Calif.) LS 13 320 Laser Diffraction Particle Size Analyzer (Beckman-Coulter, Brea, Calif.). The resulting mean particle sizes are shown in Table 1, below.

TABLE 1

Particle Size Analysis

| Example | Material | Mean Particle Size (μm) |
|---|---|---|
| 1 | Phosphinate-pMAA | 5.637 |
| 2 | Phosphinate-pMAAn | 5.944 |
| 3 | Persulfate-pMAA | 6.876 |

The formulations shown in Table 2, below, for making comb polymers from 2,000 molecular weight poly(ethylene glycol) methyl ether (mPEG2K) from Aldrich Chemicals (St. Louis, Mo.) were added to a 3 neck flask (500 mL) that was fitted with overhead stirring (290 RPMs), a thermocouple, a temperature controller, and heating mantle. All reactions were done under a blanket of $N_2$. The mPEG2k was added to the flask and it was heated to 70° C. at which point the polyacid or polyanhydride was added to the vessel. A portion of the oven dried hypophosphite telomer of methacrylic acid was then heated to 140° C. and a timer was started. At 1 hour intervals samples were taken under a $N_2$ purge, the weight of the sample was recorded on the vial and was roughly 1 gram.

TABLE 2

Formulation of PCE superplasticizers

| Example | 4 | 5 | 6 |
|---|---|---|---|
| | | Weight (g) | |
| Phosphinate-pMAA (of Example 1) | 20.00 | | |
| Phosphinate-pMAAn (of Example 2) | | 20.00 | |
| Persulfate-pMAA (of Example 3) | | | 20.01 |
| mPEG2K | 140.01 | 140.01 | 140.02 |

The sampled material (~1 g) at each one hour time interval of each example indicated in Table 2, above, was added to 20 g of 20 mM $NaH_2PO_4$ at pH=7 (about 1:20 dilution). Samples were left to dissolve on mechanical shaker at room temperature for ~16 hours. The next day, samples were further diluted in 20 mM $NaH_2PO_4$ at pH=7 at about 1:25 to total dilution of about 1:500.

Calibration standards at concentration of about 250, 500, 750, 1000, 1250, 1500 and 2000 ppm were prepared from the mPEG-2K assuming that the mPEG-2K had 100% solids. Both samples and standards were filtered using 0.45 μm PVDF (polyvinylidene fluoride) filters before injecting them into SEC columns.

The results of the separation analysis are shown in Table 3, below, as a function of % conversion or amount of mPEG esterified. T=0 is a sample taken as the mixture reaches 140° C.

TABLE 3

Percent Esterification of Acid/Anhydride with mPEG2K

| Example Time (hr.) | 4 | 5 | 6 |
|---|---|---|---|
| | | % Conversion | |
| 0 | 1 | 3 | 2 |
| 1 | 11 | 30 | 10 |
| 2 | 18 | 52 | 11 |
| 3 | 23 | 65 | 12 |
| 4 | 29 | 75 | 12.3 |
| 5 | 34 | 82 | 14 |

As shown in Table 3, above, at roughly the same molecular weight polycarboxylate polymer, the polycarboxylate hypophosphite telomer containing pMAA of Example 1 esterifies more than twice as efficiently as the persulfate initiated pMAA of Example 3. Further, the phosphorus oxide telomer of pMAAn of Example 2 esterifies very efficiently. Also, it appears that because the polycarboxylate or anhydride polymer and polyether polyol components are mixed at 70° C. and esterification occurs prior to the vessel reaching reaction temperature at 140° C. The esterification using a hypophosphite can be catalyzed at a lower temperature than the same reaction using a persulfate catalyst, which yields a sulfate heteroatom group in a (co)telomer.

Examples 7 and 7A

Hand Ground Small Particle Size Phosphorus Oxide Telomers

The polymers of Example 7 and 7A were, respectively, a pMAA hypophosphite telomer and persulfate telomer heated at 150° C. for 2 hours to drive off the water. Both were then hand pulverized with a pestle and mortar. The particle size of the dry material was evaluated and measured with a Beckman-Coulter LS 13 320 Laser Diffraction Particle Size Analyzer (Beckman-Coulter, Brea, Calif.). The results are shown in Table 4, below.

TABLE 4

Particle Size Analysis

| Example | Mean Particle Size (μm) |
|---|---|
| 7 | 562.9 |
| 7A | 744.4 |

Examples 8, 8A, 8B, 8C, 9 and 9A

Superplasticizer Reactant Formulations

As shown in Table 5, below, formulations of superplasticizer reactants comprised a polyether side chain forming reactant and the dried polymers of Examples 7 and 7A, including a 2,000 Mw poly(ethylene glycol) methyl ether (mPEG2K) (Aldrich Chemicals, St. Louis, Mo.) and an mPEG 5,000 poly(ethylene glycol) methyl ether Polygylkol™ M 5,000S (Clariant Corp., Mt. Holly West, N.C.); p-Toluenesulfonic acid monohydrate (p-TSA,>98.5% purity, solid.) and lithium hydroxide (>98% purity, solid) (Aldrich); and Irganox™ 5057 stabilizer (BASF, Vandalia, Ill.).

TABLE 5

Formulations

| | Example | | | | | |
|---|---|---|---|---|---|---|
| | 8 | 9 | 9A | 9B | 10 | 10A |
| Dried Polymer of Example 2 | 8 | | | | | |
| Dried Polymer of Example 7 | | 8 | | | 20 | |
| Dried Polymer of Example 7A | | | 8 | 8 | | 20 |
| mPEG 2,000 | | | | | 140 | 140 |

TABLE 5-continued

Formulations

| | Example | | | | | |
|---|---|---|---|---|---|---|
| | 8 | 9 | 9A | 9B | 10 | 10A |
| mPEG 5,000 | 140 | 140 | 140 | 140 | | |
| LiOH | | | | | | 0.35 |
| Irganox ™ 5057 | | | | 0.09 | | 0.29 |
| p-TSA | | | 0.22 | 0.22 | | |

The ingredients in each formulation were added to a 3 neck 500 mL round bottom equipped flask equipped with an with overhead stirrer, reflux condenser, nitrogen inlet, thermocouple connected to temperature controller, vacuum line and heating mantel with a Jack-O-Matic™ pot lifter (Glas-Col, LLC Terre Haute, Ind.). All reactants were blanketed with nitrogen and heated to 80° C. The reactants were held for 10 minutes at 80° C. and the nitrogen was shut off and the vacuum turned on. The mix was then heated to 180° C. and the timer was started. At 30 minutes, 1 hour and 2 hours samples were taken under a nitrogen purge and their conversion was calculated.

Samples for SEC analysis were prepared at about 1:500 dilution in 20 mM NaH2PO4 at pH=7. The mPEG 2K and mPEG 5K from the formulations were used to prepare calibration standards at a concentration of about 250, 500, 750, 1000, 1250, 1500 and 2000 ppm using 100% solids. Thus, the mPEG 2K was used to determine its conversion in Examples 10 and 10A while mPEG 5K was used for the same purpose in Examples 8,9, 9A and 9B. Both, samples and standards were filtered using 0.45 um PVDF filters before injecting them into SEC columns. Additionally, Examples 9, 9A, 9B, and MPEG 5K standards were also prepared in 100 mM NH4Ac in MeOH as alternative solvent and SEC was re-run for these.

The residual amounts of mPEG 2K were determined by SEC using calibration curves. The mPEG 2K conversions were determined according to the calculation (1-residual concentration of mPEG/starting concentration of mPEG)×100 to give percentage conversion. The results are shown in Table 6, below.

TABLE 6

Percent Esterification of Anhydride with mPEG

| Example | Reaction Time | Conversion (%) | Degradation (%) |
|---|---|---|---|
| 8 | 30 min | 59 | — |
| | 1 hr | 74 | — |
| | 2 hr | 84 | — |
| 9 | 30 min | 2 | 25 |
| | 1 hr | 0 | 33 |
| | 2 hr | 0 | 52 |
| 9A* | 30 min | 0 | 14 |
| | 1 hr | 2 | 23 |
| | 2 hr | 3 | 37 |
| 9B* | 30 min | 1 | 6 |
| | 1 hr | 1 | 12 |
| | 2 hr | 2 | 24 |
| 10 | 30 min | 5 | — |
| | 1 hr | 54 | — |
| | 2 hr | 85 | — |
| 10A* | 30 min | 6 | — |
| | 1 hr | 12 | — |
| | 2 hr | 20 | — |

*Comparative Example

As is evident in the conversion and degradation numbers in Table 6, above, the mPEG 5,000 did not react in the dried but not polyanhydride telomers in Examples 9, 9a, and 9b, and underwent severe degradation. Unlike the pMAA telomer in Example 8, which is a methacrylic anhydride telomer rapidly esterifies with the 5,000 mw MPEG material. For Example 9, 9a, and 9b, the mPEG 5K was prepared in 100 mM NH$_4$Ac in MeOH, and the SEC revealed substantial degradation of mPEG 5K in the range from 6 to 52% and very low conversion values from 0 to 3% in the dried polymer which was not a polymethacrylic anhydride. The degree of mPEG 5K degradation was lowest in Example 9B and was most likely due to use of Irganox™ 5057 as inhibitor. Example 8 was not measured for decomposition like Examples 9, 9a, and 9b as previously mentioned, however the elution curve from the esterification analysis of Example 8 showed no noticeable broadening of the mPEG 5,000 peak which was seen in Examples 9, 9a, and 9b; those examples which had severe degradation as noted from NH$_4$Ac in MeOH SEC analysis.

Table 6, above, also shows that with the more reactive lower Mw mPEG, the telomers of poly methacrylic acid (pMAA) of Example 10 yields better esterification when compared to persulfate containing pMAA of Example 10A. Further, the antioxidant and the lithium catalyst included in the comparison in example 10A appears not to improve yield (75% less) when compared to the same phosphorus heteroatom containing compound initiated pMAAn in Example 10.

Examples 11, 12, 13 and 14

Fine Particle Size (Co)telomers

Materials were esterified to make comb polymers. First, the sulphonate (from bisulfite) and sulfate (from persulfate) group containing telomers of methacrylic acid were heated at 150° C. for 2 hours to drive off the water. These polymethacrylic acid (pMAA) telomers were used as Example 12 and 14. A portion of the oven dried pMAA telomers of Examples 12 and 14 were then heated at 220° C. for 30 minutes to convert the acid to anhydride (pMAAn) telomers, respectively, in Examples 11 and 13. All four materials were ground using a mortar and pestle followed by further grinding with a Retsch (Newtown, Pa.) MM400 ball mill at 30 hz for 2 minutes. The particle size analysis was done on dry material with a Beckman-Coulter (Brea, Calif.) LS 13 320 Laser Diffraction Particle Size Analyzer (Beckman-Coulter, Brea, Calif.). The resulting mean particle sizes are shown in Table 7, below.

TABLE 7

Mean Particle Size

| Example | Material | Mean Particle Size (μm) |
|---|---|---|
| 11 | Bisulfite-pMAAn | 6.590 |
| 12 | Bisulfite-pMAA | 6.502 |
| 13 | Persulfate-pMAAn | 7.143 |
| 14 | Persulfate-pMAA | 6.271 |

The formulations, shown in Table 8, below, for making comb polymers from 2,000 molecular weight poly(ethylene glycol) methyl ether (mPEG2K) (Aldrich Chemicals, St. Louis, Mo.) were added to a 3 neck flask (500 mL) that was fitted with overhead stirring (290 RPMs), a thermocouple, a temperature controller, and heating mantle. All reactions were done under a blanket of N$_2$. The mPEG2k was added to the flask and it was heated to 70° C. at which point the polyacid or polyanhydride (co)telomer was added to the vessel. The mixture was then heated to 140° C. and a timer was started. At 1 hour intervals samples from each Example were taken under a $N_2$ purge, and the weight of the sample was recorded on the vial. Each sample was roughly 0.5 grams.

TABLE 8

Formulation of PCE superplasticizers

| Example | 11 | 12 | 13 | 14 |
|---|---|---|---|---|
| | | Weight (g) | | |
| Bisulfite-pMAAn | 20.00 | | | |
| Bisulfite-pMAA | | 20.00 | | |
| Persulfate-pMAAn | | | 20.00 | |
| Persulfate-pMAA | | | | 20.00 |
| mPEG2K | 140.00 | 140.00 | 140.00 | 140.00 |

Percent Esterification Measurement: The sampled material from each Example (~0.5 g) indicated in Table 8, above, was added to 20 g of 20 mM $NaH_2PO_4$ at pH=7 (about 1:20 dilution) at each one hour time interval. Samples were left to dissolve on a mechanical shaker at room temperature for ~16 hours. The next day, the samples were further diluted in 20 mM $NaH_2PO_4$ at pH=7 at about 1:25 to total dilution of about 1:500.

Calibration standards at concentrations of about 250, 500, 750, 1000, 1250, 1500 and 2000 ppm were prepared from the mPEG-2K assuming that the mPEG-2K had 100% solids. Both samples and standards were filtered using 0.45 um polyvinylidene fluoride (PVDF) filters before injecting them into SEC columns.

The results of the separation analysis are shown in Table 9, below, as a function of % conversion or amount of mPEG esterified, which is determined from the SEC data. T=0 is a sample taken as the mixture reaches 140° C.

TABLE 9

Percent Esterification of Acid/Anhydride with mPEG2K

| Example Time (hr.) | 11 | *12 | 13 | *14 |
|---|---|---|---|---|
| | | % Conversion | | |
| 0 | 2 | (−3.0) | 2 | (−0.5) |
| 1 | 39 | 2 | 8 | 5 |
| 2 | 50 | 4 | 10 | 6 |
| 3 | 56 | 6 | 11 | 7 |
| 4 | 63 | 8 | 12 | 7 |
| 5 | 67 | 11 | 13 | 6 |

*Comparative Example

As shown in Table 9, above, the sulphonate group containing methacrylic anhydride telomer in Example 11 is significantly more reactive than the corresponding methacrylic acid telomer in Example 12. The higher molecular weight sulfate containing pMAAn methacrylic anhydride telomer in Example 13 is twice as reactive as the corresponding methacrylic acid telomer in Example 14. Accordingly, methacrylic anhydride containing (co)telomers having a sulfur heteroatom, especially in the form of a sulphonate group, can when dried at drying temperatures above 200° C. perform as well as phosphorus oxide containing methacrylic acid telomers.

We claim:

1. A composition comprising particles or agglomerates of one or more (co)telomers of methacrylic anhydrides having a heteroatom and, further, having a weight average molecular weight (Mw) of from 500 to 100,000 and having a mean average particle size of from 2 μm to 1 mm, wherein the (co)telomer comprises the polymerization residue of from 20 to 98 wt. %, of polymerized units bearing methacrylic acid, anhydride or salt groups, based on the total weight of reactants used to make the (co)telomer.

2. The composition as claimed in claim 1, wherein the average particle size of the particles or agglomerates ranges from 5 μm up to 700 μm.

3. The composition as claimed in claim 1, wherein the telomers and cotelomers of methacrylic anhydride contain sulfur, phosphorous or nitrogen heteroatoms.

4. The composition as claimed in claim 1, wherein the (co)telomer comprises the polymerization residue of from 40 to 98 wt. %, of polymerized units bearing methacrylic acid, anhydride or salt groups, based on the total weight of reactants used to make the (co)telomer.

5. The composition as claimed in claim 1, wherein the (co)telomer comprises at least 10 wt. % and up to 70 wt. % of methacrylic anhydride groups, based on the total weight of acidic polymerized units in the (co)telomer.

6. The composition as claimed in claim 1, wherein the (co)telomer comprises from 2 to 20 wt. % of a heteroatom containing compound, based on the total weight of reactants used to make the (co)telomer.

7. The composition as claimed in claim 1, wherein the one or more (co)telomers of methacrylic anhydrides include a phosphorus oxide (co)telomer.

8. A method for making the composition of claim 1 comprising particles or agglomerates of one or more methacrylic anhydride group containing (co)telomers comprising:
aqueous solution addition polymerizing a monomer mixture of one or more methacrylic acid or salt in the presence of a heteroatom containing compound chosen from an alkyl mercaptan, oxidized alkyl mercaptan, sulfite, sulfonate, phosphite, hypophosphite, RAFT (Reversible Addition-Fragmentation Chain Transfer) catalyst, an azo initiator, and combinations thereof, drying the resulting copolymer at a temperature of from 120 to 230° C. to form one or more methacrylic anhydride group and reducing its particle size to make a (co)telomer particle or agglomerate.

9. The method as claimed in claim 8, wherein the drying comprises spray drying, fluid bed drying, melt extrusion, and spray drying followed by extrusion or drum drying.

10. The method as claimed in claim 8, wherein the reducing the particle size comprises grinding, milling, trituration, comminuting, crushing, or cryogrinding.

11. The method as claimed in claim 8, further comprising:
reacting the (co)telomer particle or agglomerate with one or more polyether polyol, alkyl polyether polyol, polyether amine or alkyl polyether amine, with heating, to form a comb polymer.

* * * * *